March 10, 1964 E. S. PETERSON 3,124,657

WIRELESS LOUDSPEAKING TELEPHONE

Filed Oct. 4, 1960 2 Sheets-Sheet 1

INVENTOR.
Edward S. Peterson
BY
C. A. Gulbrandsen
Att'y.

March 10, 1964 E. S. PETERSON 3,124,657

WIRELESS LOUDSPEAKING TELEPHONE

Filed Oct. 4, 1960 2 Sheets-Sheet 2

INVENTOR.
Edward S. Peterson
BY C. A. Gulbrandsen
Atty.

3,124,657

WIRELESS LOUDSPEAKING TELEPHONE

Edward S. Peterson, Bensenville, Ill., assignor to Automatic Electric Laboratories, Inc., Northlake, Ill., a corporation of Delaware Filed Oct. 4, 1960, Ser. No. 60,469
14 Claims. (Cl. 179—81)

This invention relates to communication systems and more particularly to a loudspeaking or distant talking telephone station including a wireless or radiant energy link.

Loudspeaking or distant talking telephones have been known for many years and particularly in recent times have enjoyed considerable commercial success. However one of the principal disadvantages of prior loudspeaking telephone designs lies in a limited range of operation provided by these instruments. Because of considerations such as acoustic feedback between microphone and loudspeaker and circuit interaction in hybrid coils or voice switched circuits; the amount of gain available for amplification of loudspeaker and microphone channels as usually employed in loudspeaking telephones is distinctly limited. Maximum distances for operation of loudspeaking telephones (between the user and the instrument) are usually in the nature of 10 or 15 feet with much shorter distances being a rule rather than the exception.

Accordingly it is the object of the present invention to provide a loudspeaking or distant talking telephone operable over extremely long distances for example hundreds of feet, such as might be encountered in large factories, stockrooms, warehouses, etc. A conversation may be participated in by a subscriber having a loudspeaking telephone instrument in accordance with this invention with the subscriber free to move about and converse over distances far in excess of those provided by prior loudspeaking telephones.

A feature of applicant's invention is the inclusion of a wireless or radiant energy link in the transmission circuitry of a loudspeaking telephone.

Another feature is the inclusion of control means operable over a wireless link to initiate a telephone call from a location remote from the substation apparatus terminating a telephone line.

Still another feature is the control of loudspeaking telephone operation from receive to transmit function by means of wireless circuitry.

Another feature shall be the provision of unique circuitry for the transmission of dial pulses and reception of same over a wireless link.

These and other objects and other features of the invention will be more fully apparent from the claims and from the description of the operation of the system as it proceeds in connection with the appended drawings wherein:

Figure 1:
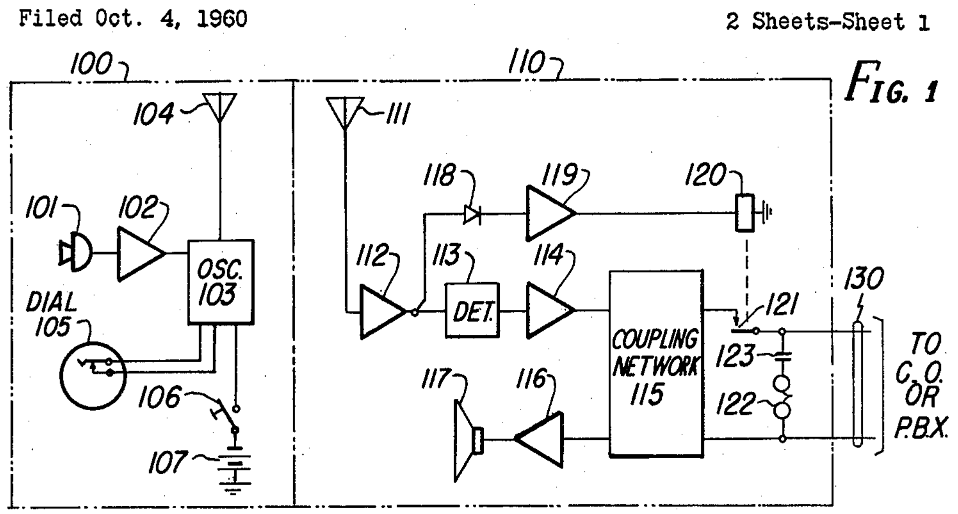
FIGURE 1 is a diagrammatic sketch of a loudspeaking telephone system according to the present invention.

For a better understanding of this invention reference is made first to FIGURE 1 which shows a telephone substation according to one embodiment of this invention comprising a remote portable transmitting station 100 and the receiving or base station 110. The transmitting station 100, includes a microphone 101, an amplifier 102 used for modulation purposes, an oscillator 103 for generating radio frequency signals, an antenna 104, a calling device or dial 105, a switch 106 used to turn the transmitting unit 100 on and off, and a source of potential 107. Unit 100 is essentially a small wireless or radio phone transmitter.

For the purposes of this disclosure the modulation amplifier 102 and oscillator 103 may be small transistorized units of conventional circuitry and the calling device 105 may be a conventional telephone dial, series of push buttons or other similar arrangements. Since the range of radiation of this transmitting unit is limited, antenna 104 may be a small loop type contained within the housing of the transmitting unit 100 or it may be a ferrite core loopstick or any similar type of limited range antenna.

The receiving or base station unit as part of the substation of FIGURE 1 includes a receiving antenna 111 that may be similar in design to that of the transmitting antenna 104, a radio frequency amplifier 112, a detector circuit 113 for extracting an audio signal from the radio frequency amplified signal available from the output of amplifier 112, an audio amplifier 114, a second audio amplifier 116 coupled to loudspeaker 117, a rectifier 118 and D.C. amplifier 119. The several amplifiers of base unit 110 as well as the detector may be of any conventional circuitry and preferably in this embodiment would include the use of transistors for the sake of miniaturization and reduced power requirements. Base unit 110 also includes a coupling network 115 which may be a hybrid coil or some form of bridge network or voiced switched circuitry for coupling both incoming signals from, and outgoing signals to a single telephone line, a relay 120 and its associated contacts 121, a telephone line 130 extending between the receiving or base station 110 and a central office telephone exchange or private branch telephone exchange, a ringer 122 and associated capacitor 123.

Figure 2:
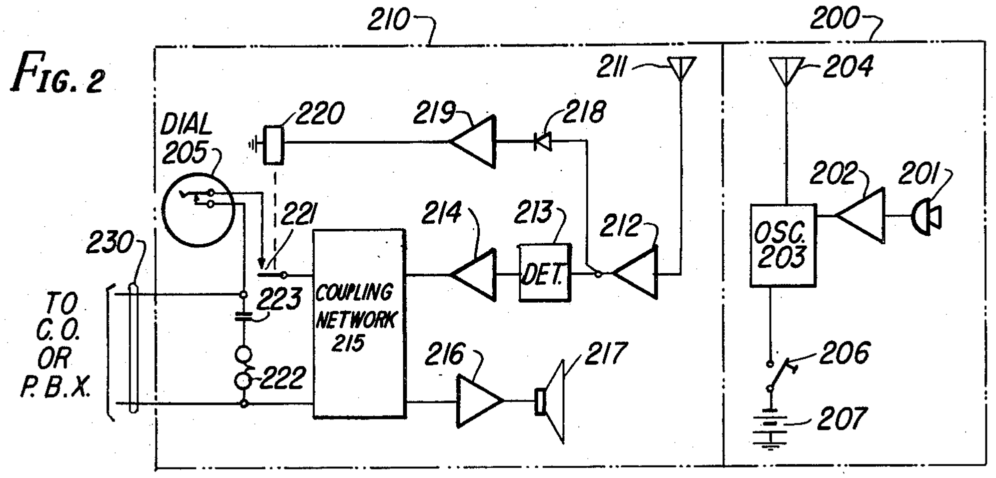
FIGURE 2 is a diagrammatic sketch of an alternate embodiment of the present invention.

Referring now to FIGURE 2 a substation similar to that in FIGURE 1 is disclosed. All of the components of the system shown in FIG. 2 are exactly the same as the corresponding components of FIG. 1 except that the first digit of the three digit designations correspond respectively to the number of the figure in which they are shown. In this system however, dial 205 is included in the circuitry at the receiving or base unit 210 rather than in the remote portable transmitting unit 200.

Figure 3:
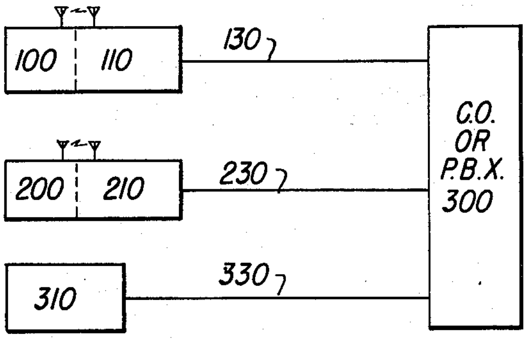
FIGURE 3 is a block diagram of a telephone system including loudspeaking wireless telephones in accordance with FIGS. 1 and 2.

FIGURE 3 shows a telephone central office 300, a wireless loudspeaking telephone as shown in FIGURE 1 consisting of transmitting unit 100 and receiving unit 110, connected to the central office by line 130, a wireless loudspeaking telephone as shown in FIGURE 2 consisting of transmitting unit 200 and receiving unit 210, connected to the central office by line 230 and a conventional telephone substation 310 connected to the central office by line 330.

Figure 4:
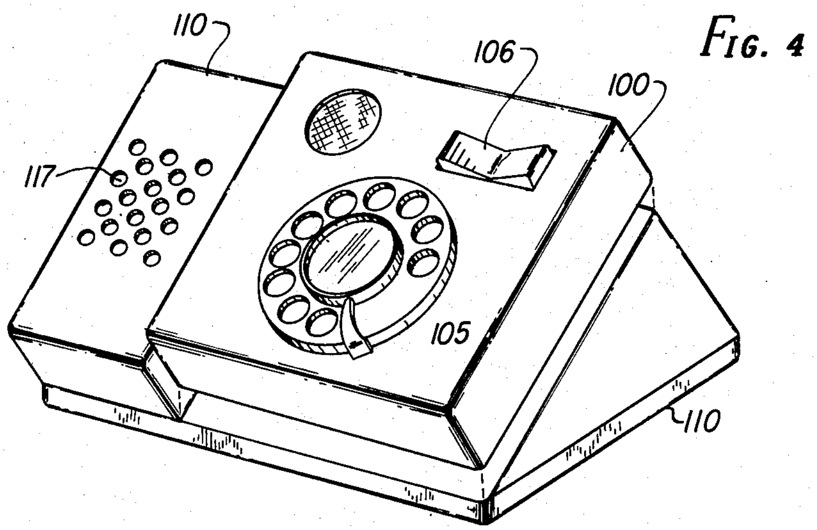
FIGURE 4 is a drawing of a telephone substation embodying circuitry according to the system shown in FIGURE 1.
Figure 5:
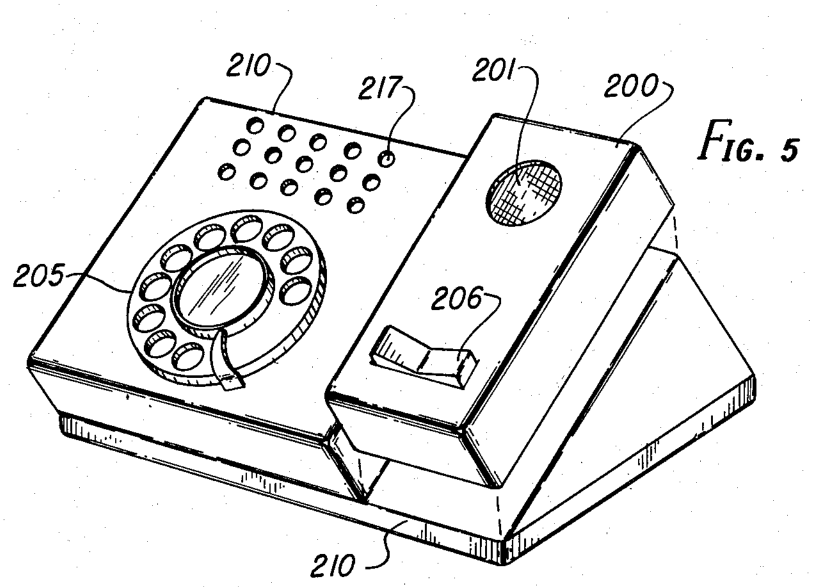
FIGURE 5 is a drawing of a substation employing circuitry in accordance with the alternate system of FIGURE 2.

In FIGURE 4 it can be seen how the receiving or base station unit 110 can be arranged to provide the space to temporarily support the remote portable transmitting unit 100 when it is not in use on a portable basis. It contains microphone 101, dial 105, and power switch 106 and other components shown in FIG. 1. Base unit 110 of course mounts loudspeaker 117 located immediately behind the openings shown in FIGURE 4 and the other components shown in FIG. 1. FIGURE 5 is similar to FIGURE 4. It shows how a substation embodying the circuitry of FIGURE 2 might appear when the dial 205 is mounted on the base unit 210 to provide the temporary support for the remote portable transmitting unit 200 when not in use as a portable unit.

For a further understanding of applicant's invention operation of the several embodiments shown will be described in connection with both the receiving of an incoming telephone call and the origination of an outgoing telephone call at the remote portable transmitting unit.

Referring again to FIGURE 1, an incoming telephone call for the subscriber at station 110 is signaled by the placement of ringing current on line 130 from the central office or private branch exchange. This ringing current is applied through condenser 123 to a signaling device 122 which can be a conventional ringer or perhaps may be an audio frequency oscillator triggered by the ringing current or other device. The resultant signal audible or possibly visual in character, signals the subscriber at the substation 100 in accordance with FIGURE 1. If the subscriber hears or sees the signal he operates power switch 106 connecting power supply 107 to the oscillator 103 causing it to operate. Oscillator 103 then produces a radio frequency signal which is radiated at antenna 104. This radio frequency signal is merely a carrier and does not include audio components.

This signal is then received at antenna 111 of base unit 110, is amplified by amplifier 112, is rectified by rectifier 118, amplified by D.C. amplifier 119 and the resultant signal applied to relay 120 causing it to operate. Operation of relay 120 closes contacts 121, connecting line 130 to coupling network 115. This network provides the proper supervision back over telephone line 130 to the exchange equipment to stop the further application of ringing current to the line and prepares the substation 110 for receipt of conversation from the calling party.

Upon operation of power switch 106 at transmitting unit 100 the subscriber thereon may now answer the call by speaking into microphone 101. The feeble microphone current is amplified by amplifier-modulator 102 and the resulting modulated signal is then applied to oscillator 103. The modulated signal is now radiated at transmitting antenna 104, received at receiving antenna 111 of base unit 110, amplified by amplifier 112 to supply the amplified radio frequency signal to detector 113 which detects the audio component of the received signal extending same to audio amplifier 114, to coupling network 115 which in turn couples this signal by way of the line 130 to the central office and the calling party. At the same time a portion of this signal from the amplifier 112 is rectified by rectifier 118 and then amplified by amplifier 114 to retain relay 120 in its operated position.

The incoming voice signals from the calling subscriber at the central office or private branch exchange is received over the conductors of the line 130 at coupling network 115. This circuit is completed through contacts 121 and coupled in the coupling network 115 to audio amplifier 116 which supplies the amplified voice signals received over the telephone line from the subscriber at the distant end, to loudspeaker 117. The called subscriber at the remote wireless substation 110 hears incoming audio signals through loudspeaker 117 and replies over the microphone 101 so that two way conversation may ensue. Upon completion of the call the circuitry is restored to normal by the opening of switch 106 to power supply 107.

To place a call from the remote portable substation 100 of applicant's invention, the subscriber operates switch 106 connecting the power supply 107 to oscillator 103 causing a radio frequency carrier signal to be radiated at transmitting antenna 104. This signal is picked up at the receiving antenna 111 of base unit 110, where it is rectified by rectifier 118, amplified by D.C. amplifier 119 causing relay 120 to operate. Operation of relay 120, at its contacts 121, connects coupling network 115 to the line 130. Connection of the coupling network 115 to the line 130 is effective to seize the usual line equipment provided at the central office or private branch exchange which returns dial tone over line 130. This dial tone signal is coupled through the coupling network 115 to the amplifier 116 and is amplified by audio amplifier 116 and is heard by the calling subscriber through the loudspeaker 117. The subscriber then operates dial 105 in accordance with the digits of the called subscriber's telephone number. This dial when operated in a conventional manner is effective to quench the radio frequency oscillations of oscillator 103 in direct accord with the opening of the pulsing springs of dial 105. Thus it should be apparent that operation of dial 105 is effective to interrupt radio frequency transmissions of transmitter 110, in a manner effective to simulate dial pulses. Each time the carrier is no longer present no signal is present at receiving antenna 111 and consequently relay 120 restores and contacts 121 are opened. Each opening of contacts 121 corresponds therefore to a dial pulse. The resultant pulses are transmitted over line 130 to the central office or private branch exchange to operate the conventional automatic switching equipment provided thereat. As soon as a connection is completed to the called subscriber's line, ringing current is transmitted to the called line and a ringback tone is returned to line 130. The ringback tone returned over line 130, is extended through the coupling network 115, amplified by amplifier 116 and heard by the calling subscriber through loudspeaker 117. The sounds reproduced by loudspeaker 117 are of course audible to the subscriber at the loudspeaking telephone even though this subscriber may have moved some distance away from the substation. When the called subscriber at the distant end lifts his handset from the hookswitch, the ringing current and ringback tone signals are terminated in the usual manner and conversation may then commence. Upon completion of the call the circuitry is restored to normal by the opening of switch 106 to power supply 107.

A subscriber equipped with a substation in accordance with FIGURE 2 would receive telephone calls in a manner similar to that for a subscriber having equipment in accordance with FIGURE 1. However a subscriber equipped with a substation in accordance with FIGURE 2 could initiate a telephone call only from the base unit 210 and not from the portable station 200 because of the location of the dial 205 in the circuit of the telephone line 230. The telephone line 230 would still be closed from the central office or private branch exchange through to the coupling network 215 by means of operation of the relay 220 actuated from the transmitting unit 200.

This invention may be embodied in other specific forms without departing from the spirit or essential characteristics thereof. The present embodiment is therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed is:

1. In a telephone system, a telephone line and a wireless loudspeaking telephone comprising: a transmitting unit including signal generating means, a transmitting antenna connected to said signal generating means for radiating signals generated by said means, and switch means operated for actuating said signal generating means; a receiving unit including voice frequency signal reproduction means, a receiving antenna for receiving signals from said transmitting unit, a coupling network, line connecting means connected to said receiving antenna operated in response to signals received from said transmitting unit to connect said coupling network to said telephone line, said coupling network operated to couple signals from said receiving antenna to said telephone line and further to couple signals received from said line to said voice frequency signal reproduction means.

2. In a telephone system, a telephone line and a wireless loudspeaking telephone comprising: a transmitting unit including signal generating means, a transmitting antenna connected to said signal generating means for radiating signals generated by said means, a power supply, and switch means operated for connecting said power supply to said signal generating means to actuate said signal generating means; a receiving unit including voice frequency signal reproduction means, a receiving antenna for receiving signals from said transmitting unit, a coupling network, line connecting means connected to said receiving antenna by a unidirectional conducting device operated in response to signals received from said receiving antenna to operate said line connecting means, signal detection means connected to said receiving antenna operated to detect the audio portion of the signal received from said receiving antenna, and connected to said coupling network, said signal detection means operated to extend the detected audio signal through said coupling network to said telephone line, said voice signal reproduction means operated to reproduce signals received through said coupling network from said telephone line.

3. A wireless loudspeaking telephone as claimed in claim 2 wherein said transmitting unit includes a calling device connected to said signal generating means and operated to provide switching control in said telephone system.

4. A wireless loudspeaking telephone as claimed in claim 2 wherein said receiving unit includes a calling device connected between said line and said coupling network operated to transmit pulses over said line to provide switching control in said telephone system.

5. In a telephone system, a telephone line and a wireless loudspeaking telephone comprising: a transmitting unit including signal generating means, a transmitting antenna connected to said signal generating means for radiating signals generated by said means, a power supply, and switch means operated for connecting said power supply to said signal generating means to actuate said signal generating means; a receiving unit including voice frequency signal reproduction means, a receiving antenna for receiving signals from said transmitting unit, a radio frequency amplifier connected to said receiving antenna for amplifying said received signals, a coupling network, line connecting means connected to said radio frequency amplifier by a unidirectional conducting device operated in response to signals received from said radio frequency amplifier to provide operating potential for said line connecting means, a direct current amplifier connecting said unidirectional conducting means to said line connecting means, signal detection means connected to said radio frequency amplifier and operated to detect the audio portion of the signal received from said radio frequency amplifier, a first audio frequency amplifier connecting said coupling network to said signal detection means operated to amplify the detected audio signal and extend same through said coupling network to said telephone line, a second audio frequency amplifier connecting said coupling network to said voice signal reproduction means operated to amplify signals received through said coupling network from said telephone line for reproduction by said voice signal reproduction means.

6. A wireless loudspeaking telephone as claimed in claim 5 wherein said transmitting unit includes a calling device connected to said signal generating means and operated to provide switching control in said telephone system.

7. A wireless loudspeaking telephone as claimed in claim 5 wherein said receiving unit includes a calling device connected between said line and said coupling network operated to transmit pulses over said line to provide switching control in said telephone system.

8. In a telephone system, a telephone line and a wireless loudspeaking telephone comprising: a transmitting unit including an oscillator operating at radio frequencies, a modulator coupled to said oscillator, a microphone connected to said modulator and in response to voice signals effective to operate said modulator to modulate said radio frequency signals generated by said oscillator, a transmitting antenna connected to said oscillator for radiating said radio frequency signals, a power supply, a control switch operated to connect said power supply to said oscillator and said modulator to actuate said transmitting unit; a receiving unit including voice frequency signal reproduction means, a receiving antenna for receiving signals from said transmitting unit, a radio frequency amplifier connected to said receiving antenna for amplifying said received signals, a coupling network, line connecting means connected to said radio frequency amplifier by a unidirectional conducting device operated in response to signals received from said radio frequency amplifier to provide operating potential for said line connecting means, a direct current amplifier connecting said unidirectional conducting means to said line connecting means, signal detection means connected to said radio frequency amplifier and operated to detect the audio portion of the signal received from said radio frequency amplifier, a first audio frequency amplifier connecting said coupling network to said signal detection means operated to amplify the detected audio signal and extend same through said coupling network to said telephone line, a second audio frequency amplifier connecting said coupling network to said voice signal reproduction means operated to amplify signals received through said coupling network from said telephone line for reproduction by said voice signal reproduction means.

9. A wireless loudspeaking telephone as claimed in claim 8 wherein said transmitting unit including a dial connected to said oscillator and operated to control said oscillator to provide switching control in said telephone system.

10. In a telephone system, a telephone line and a wireless loudspeaking telephone comprising: a transmitting unit including signal generating means, a transmitting antenna connected to said signal generating means for radiating signals generated by said means, a power supply, and means operated for connecting said power supply to said signal generating means to actuate said signal generating means; a receiving unit including a loudspeaker, a receiving antenna for receiving signals from said transmitting unit, a radio frequency amplifier connected to said receiving antenna for amplifying signals received from said transmitting unit, a coupling network, a line relay operated in response to signals received from said transmitting unit by said receiving antenna to connect said coupling network to said line, a rectifier coupled to said radio frequency amplifier, a direct current amplifier connecting said rectifier to said line relay for amplifying and extending rectified signals from said transmitting unit to said line relay, a first audio frequency amplifier connected to said coupling network, a detector connected between said radio frequency amplifier and said first audio frequency amplifier for detecting the audio portion of the signal received from said transmitting unit, a second audio frequency amplifier connecting said coupling network to said loudspeaker operated to amplify signals received from said line and extended through said coupling network to said loudspeaker.

11. In a wireless loudspeaking telephone as claimed in claim 10 wherein said receiving unit includes a dial connected between said line and said coupling network operated to transmit dial pulses over said telephone line to provide switching control in said telephone system.

12. In a telephone system, a telephone line and a wireless loudspeaking telephone comprising: a transmitting unit including an oscillator operating at radio frequencies, a modulator coupled to said oscillator, a microphone connected to said modulator and operated in response to voice signals to operate said modulator to modulate said radio frequency signals generated by said oscillator, a transmitting antenna connected to said oscillator for radiating said radio frequency signals, a power supply, a control switch operated to connect said power supply to said oscillator and modulator to actuate said transmitting unit; a receiving unit including a loudspeaker, a receiving antenna for receiving signals from said transmitting unit, a radio frequency amplifier connected to said receiving antenna for amplifying signals received from said transmitting unit, a coupling network, a line relay operated in response to signals received from said transmitting unit by said receiving antenna to connect said coupling network to said line, a rectifier coupled to said radio frequency amplifier, a direct current amplifier connecting said rectifier to said line relay for amplifying and extending rectified signals from said transmitting unit to said line relay, a first audio frequency amplifier connected to said coupling network, a detector connected between said radio frequency amplifier and said first audio frequency amplifier for detecting the audio portion of the signal received from said transmitting unit, a second audio frequency amplifier connecting said coupling network to said loudspeaker operated to amplify signals received from said line and extended through said coupling network to said loudspeaker.

13. In a wireless loudspeaking telephone as claimed in claim 12 a dial connected to said oscillator and operated to control said oscillator to provide switching control in said telephone system.

14. In a wireless loudspeaking telephone as claimed in claim 12 wherein said receiving unit includes a dial connected between said line and said coupling network operated to transmit dial pulses over said telephone line to provide switching control in said telephone system.

References Cited in the file of this patent

UNITED STATES PATENTS

| | | |
|---|---|---|
| 1,909,812 | Cooke | May 16, 1933 |
| 2,399,682 | Kucera | May 7, 1946 |
| 2,894,121 | Phillips | July 7, 1959 |
| 3,037,086 | Abbott et al. | May 29, 1962 |